US012611559B1

(12) United States Patent
Kreger

(10) Patent No.: US 12,611,559 B1
(45) Date of Patent: Apr. 28, 2026

(54) WIRELINE TRAVERSAL DEVICE

(71) Applicant: Kreger Innovations LLC, Huntsville, TX (US)

(72) Inventor: John Marvin Kreger, Huntsville, TX (US)

(73) Assignee: Kreger Innovations LLC, Huntsville, TX (US)

(*) Notice: Subject to any disclaimer, the term of this patent is extended or adjusted under 35 U.S.C. 154(b) by 489 days.

(21) Appl. No.: 18/203,043

(22) Filed: May 29, 2023

Related U.S. Application Data

(63) Continuation-in-part of application No. 16/522,257, filed on Jul. 25, 2019, now Pat. No. 11,660,478.

(60) Provisional application No. 62/702,742, filed on Jul. 24, 2018.

(51) Int. Cl.
*A63G 21/22* (2006.01)
*A62B 35/00* (2006.01)

(52) U.S. Cl.
CPC ...... *A62B 35/0081* (2013.01); *A62B 35/0087* (2013.01); *A63G 21/22* (2013.01); *A62B 35/0056* (2013.01)

(58) Field of Classification Search
CPC ......... A62B 1/02; A62B 1/20; A62B 35/0056; A62B 35/0081; A62B 35/0087; A63G 21/20; A63G 21/22; B61B 7/00; B61B 12/02; B61H 9/02
See application file for complete search history.

(56) References Cited

U.S. PATENT DOCUMENTS 3,648,664 A * 3/1972 Nunley .................... A01K 1/04 119/785
4,790,410 A * 12/1988 Sharp ................ A62B 35/0056 182/12
5,279,385 A * 1/1994 Riches .............. A62B 35/0056 182/36
5,931,100 A * 8/1999 Sutton .................... A63G 21/20 104/53
6,474,442 B1 * 11/2002 Atkinson ................ A62B 1/14 104/115
6,622,634 B2 * 9/2003 Cylvick ................ A63G 21/22 104/53
7,950,496 B2 * 5/2011 Renton ............. A62B 35/0056 182/36

(Continued)

FOREIGN PATENT DOCUMENTS

GB 2388148 A * 11/2003 ........... A62B 35/005
KR 101486332 B1 * 1/2015 ......... E04G 21/3204
WO WO-2008020215 A1 * 2/2008 ......... A62B 35/0087

*Primary Examiner* — Colleen M Chavchavadze
(74) *Attorney, Agent, or Firm* — Quisenberry Law PLLC

(57) ABSTRACT

A wireline traversal device may include an outer housing having a longitudinal slot, and an inner housing rotatably disposed within the outer housing. The inner housing includes a helical slot, a forward end of which is aligned with the longitudinal slot in the outer housing when the inner housing is in a home position. A forward end cap having a longitudinal slot and an inclined engagement surface is attached to a forward end of the outer housing. The longitudinal slot on the outer housing is aligned with the longitudinal slot on the forward end cap. The wireline traversal device may be used in a variety of applications in connection with a wireline, such as a zip line or safety line. Capability to steer the device at a fork or branch in a wireline is also disclosed.

20 Claims, 11 Drawing Sheets

(56) References Cited

U.S. PATENT DOCUMENTS

| | | | | |
|---|---|---|---|---|
| 8,985,027 | B2 * | 3/2015 | Brown | A63G 21/20<br>104/53 |
| 10,201,720 | B2 * | 2/2019 | Jones | A62B 35/0081 |
| 10,220,859 | B2 * | 3/2019 | Reese | A63G 9/04 |
| 10,420,967 | B2 * | 9/2019 | Poldmaa | A62B 35/0087 |
| 11,660,478 | B1 * | 5/2023 | Kreger | A62B 35/0081<br>182/36 |
| 2011/0073408 | A1 * | 3/2011 | Vetesnik | E04G 21/3276<br>182/36 |
| 2015/0090148 | A1 * | 4/2015 | Weston | A62B 35/0081<br>104/91 |
| 2019/0143156 | A1 * | 5/2019 | Weston | A62B 35/0062<br>104/91 |
| 2022/0152436 | A1 * | 5/2022 | Squire | A62B 35/0081 |

* cited by examiner

WIRELINE TRAVERSAL DEVICE

RELATED APPLICATIONS

This application is a continuation-in-part of U.S. Non-Provisional patent application Ser. No. 16/522,257, filed Jul. 25, 2019, which claims the benefit of U.S. Provisional Application No. 62/702,742, filed Jul. 24, 2018. Each of the foregoing applications and the contents thereof are fully incorporated herein by reference.

BACKGROUND OF THE INVENTIONS

1. Field of the Inventions

The present inventions generally pertain to devices that move along a wireline, such as a zip line or safety line, and more particularly to devices that can traverse a curved section of wireline.

2. Description of the Related Art

The inventions disclosed herein are generally directed to devices that can be used on a wireline, such as a zip line or a safety line on an offshore or other elevated platform or surface, to go around a corner. As is well known, zip lines traditionally follow a straight-line path from an elevated platform to either a lower platform or the ground. A person normally wears a harness. A support line is connected to the harness and to the overhead wire, such as to a small connecting loop that moves along the wireline. The present inventions have been developed to allow a zip line or other wireline to turn a corner, such as around or adjacent a tree, pole or other support structure, as opposed to being entirely in a straight line. Another potential application is on offshore oil rig platforms, or other elevated surfaces such as high-rise buildings under construction, where workers are required to have a safety line attached to themselves (e.g., on a belt or harness) and to an overhead or safety wire (such as by a small connecting loop on the overhead or safety wire) that goes around the perimeter of the platform or high-rise building structure.

The challenge presented arises because a wire that turns a corner must be attached to a tree, pole or support structure, such as by a generally horizontal support rod or member. When the connecting loop that is moving along the overhead wire reaches the support rod at the corner, the support rod will prevent the loop (and the attached person) from going any further, unless the connecting loop is manually disconnected and then manually reconnected on the other side of the support rod. The present inventions provide alternatives to a traditional connecting loop that will allow the support rod to pass through the present inventive devices without disconnecting the devices from the wireline.

A variety of devices have been developed in the past, some of which address the problem discussed above, examples of which are shown in the following materials: U.S. Pat. No. 4,790,410 to Sharp et al. entitled “Safety Track Support and Coupling”; U.S. Pat. No. 5,343,975 to Riches et al. entitled “Personnel Fall-Arrest Systems”; U.S. Pat. No. 5,350,037 to Ghahremani entitled “Workperson Safety Restraint System”; U.S. Pat. No. 5,931,100 to Sutton et al. entitled “Track-Supported Playground Shuttle”; U.S. Pat. No. 6,474,442 to Atkinson et al. entitled “Safety Device”; U.S. Pat. No. 8,746,149 to Elhard entitled “Turn Wheel and Method for Supporting Curved Portion of a Load-Transporting Cable”; U.S. Pat. No. 9,145,148 to Tilley entitled “Cable Transport System”; U.S. Pat. No. 10,005,477 to Louwsma entitled “Suspended Cable Transportation Vehicle and System”; United States Patent Application Publication No. 2018/0154197 to Riches entitled “Horizontal Lifelines with Safety Improvements”; and United Kingdom Patent No. GB 2,388,148 to Attwood entitled “Safety Anchor Device”. The disclosures of these materials, however, do not adequately solve the above-described issue.

As will become apparent from the description and explanation set forth below, the present inventions overcome the above-described problem by providing devices capable of traversing a wireline around a corner.

SUMMARY OF THE INVENTIONS

Wireline traversal devices are disclosed. In one aspect, a specific embodiment of the present inventions may be a wireline traversal device comprising: an outer cylindrical housing having a longitudinal slot; a forward end cap having a longitudinal slot and an inclined engagement surface, the forward end cap being attached to a forward end of the outer cylindrical housing, the longitudinal slot on the outer cylindrical housing being aligned with the longitudinal slot on the forward end cap; an inner cylindrical housing having a helical slot having an entry point and an exit point, the inner cylindrical housing being rotatably disposed within the outer cylindrical housing and having a home position in which the entry point of the helical slot is aligned with the longitudinal slot on the outer cylindrical housing and with the longitudinal slot on the forward end cap; a left steer arm connected to a left side of the outer cylindrical housing; and a right steer arm connected to a right side of the outer cylindrical housing. Another feature of this aspect of the present invention may be that the device further includes a rear bearing member and a forward bearing member, the rear bearing member connected to a rear end of the inner cylindrical housing, the forward bearing member connected to a forward end of the inner cylindrical housing, each of the rear bearing member and the forward bearing member being rotatably disposed within the outer cylindrical housing. Another feature of this aspect of the present invention may be that each of the rear bearing member and the forward bearing member includes a spring-loaded detent ball bearing adapted for engagement with a corresponding recess in an inner surface of the outer cylindrical housing, each spring-loaded detent ball bearing being engaged with its corresponding recess when the inner cylindrical housing is in its home position. Another feature of this aspect of the present invention may be that the rear bearing member includes an alignment tab engaged with an alignment notch in the rear end of the inner cylindrical housing, and the forward bearing member includes an alignment tab engaged with an alignment notch in the forward end of the inner cylindrical housing. Another feature of this aspect of the present invention may be that the device further includes: a support sleeve attached to an exterior surface of the outer cylindrical housing and defining a semi-circular space between an inner surface of the support sleeve and the exterior surface of the outer cylindrical housing; and a retainer plate having a semi-circular profile and moveably disposed within the semi-circular space, the retainer plate further including a connector having an aperture therethrough. Another feature of this aspect of the present invention may be that the retainer plate further including a plurality of ball bearings disposed within the semi-circular space to facilitate movement of the retainer plate within the semi-circular space. Another feature of this aspect of the present invention may be that the device further including a connector rotatably attached to the outer cylindrical housing. Another feature of this aspect of the present invention may be that the helical slot in the inner cylindrical housing traverse 360 degrees in a spiral around and along a length of the inner cylindrical housing from the entry point to the exit point. Another feature of this aspect of the present invention may be that the device further includes a left steer cord connected to the left steer arm, and a right steer cord connected to the right steer arm.

In another aspect, the present inventions may include a wireline traversal device comprising: an outer cylindrical housing having a longitudinal slot; a forward end cap having a longitudinal slot and an inclined engagement surface, the forward end cap being attached to a forward end of the outer cylindrical housing, the longitudinal slot on the outer cylindrical housing being aligned with the longitudinal slot on the forward end cap; an inner cylindrical housing having a helical slot having an entry point and an exit point, the inner cylindrical housing being rotatably disposed within the outer cylindrical housing and having a home position in which the entry point of the helical slot is aligned with the longitudinal slot on the outer cylindrical housing and with the longitudinal slot on the forward end cap; a rear bearing member and a forward bearing member, the rear bearing member connected to a rear end of the inner cylindrical housing, the forward bearing member connected to a forward end of the inner cylindrical housing, each of the rear bearing member and the forward bearing member being rotatably disposed within the outer cylindrical housing; a left steer arm connected to a left side of the outer cylindrical housing; and a right steer arm connected to a right side of the outer cylindrical housing. Another feature of this aspect of the present invention may be that the each of the rear bearing member and the forward bearing member includes a spring-loaded detent ball bearing adapted for engagement with a corresponding recess in an inner surface of the outer cylindrical housing, each spring-loaded detent ball bearing being engaged with its corresponding recess when the inner cylindrical housing is in its home position. Another feature of this aspect of the present invention may be that the the rear bearing member includes an alignment tab engaged with an alignment notch in the rear end of the inner cylindrical housing, and the forward bearing member includes an alignment tab engaged with an alignment notch in the forward end of the inner cylindrical housing. Another feature of this aspect of the present invention may be that the device further includes: a support sleeve attached to an exterior surface of the outer cylindrical housing and defining a semi-circular space between an inner surface of the support sleeve and the exterior surface of the outer cylindrical housing; and a retainer plate having a semi-circular profile and moveably disposed within the semi-circular space, the retainer plate further including a connector having an aperture therethrough. Another feature of this aspect of the present invention may be that the retainer plate further including a plurality of ball bearings disposed within the semi-circular space to facilitate movement of the retainer plate within the semi-circular space. Another feature of this aspect of the present invention may be that the device further includes a connector rotatably attached to the outer cylindrical housing. Another feature of this aspect of the present invention may be that the helical slot in the inner cylindrical housing traverse 360 degrees in a spiral around and along a length of the inner cylindrical housing from the entry point to the exit point.

In another aspect, the present inventions may include a wireline traversal device comprising: an outer cylindrical housing having a longitudinal slot; a forward end cap having a longitudinal slot and an inclined engagement surface, the forward end cap being attached to a forward end of the outer cylindrical housing, the longitudinal slot on the outer cylindrical housing being aligned with the longitudinal slot on the forward end cap; an inner cylindrical housing having a helical slot having an entry point and an exit point, the inner cylindrical housing being rotatably disposed within the outer cylindrical housing and having a home position in which the entry point of the helical slot is aligned with the longitudinal slot on the outer cylindrical housing and with the longitudinal slot on the forward end cap; a support sleeve attached to an exterior surface of the outer cylindrical housing and defining a semi-circular space between an inner surface of the support sleeve and the exterior surface of the outer cylindrical housing; a retainer plate having a semi-circular profile and moveably disposed within the semi-circular space, the retainer plate further including a connector having an aperture therethrough; a left steer arm connected to a left side of the support sleeve; and a right steer arm connected to a right side of the support sleeve. Another feature of this aspect of the present invention may be that the retainer plate further including a plurality of ball bearings disposed within the semi-circular space to facilitate movement of the retainer plate within the semi-circular space. Another feature of this aspect of the present invention may be that the device further includes a rear bearing member and a forward bearing member, the rear bearing member connected to a rear end of the inner cylindrical housing, the forward bearing member connected to a forward end of the inner cylindrical housing, each of the rear bearing member and the forward bearing member being rotatably disposed within the outer cylindrical housing. Another feature of this aspect of the present invention may be that each of the rear bearing member and the forward bearing member includes a spring-loaded detent ball bearing adapted for engagement with a corresponding recess in an inner surface of the outer cylindrical housing, each spring-loaded detent ball bearing being engaged with its corresponding recess when the inner cylindrical housing is in its home position.

Other features, aspects and advantages of the present inventions will become apparent from the following discussion and detailed description.

While the inventions will be described in connection with the preferred embodiments, it will be understood that the scope of protection is not intended to limit the inventions to those embodiments. On the contrary, the scope of protection is intended to cover all alternatives, modifications, and equivalents as may be included within the spirit and scope of the inventions as defined by the appended claims.

DETAILED DESCRIPTION OF THE INVENTION

Figure 1:
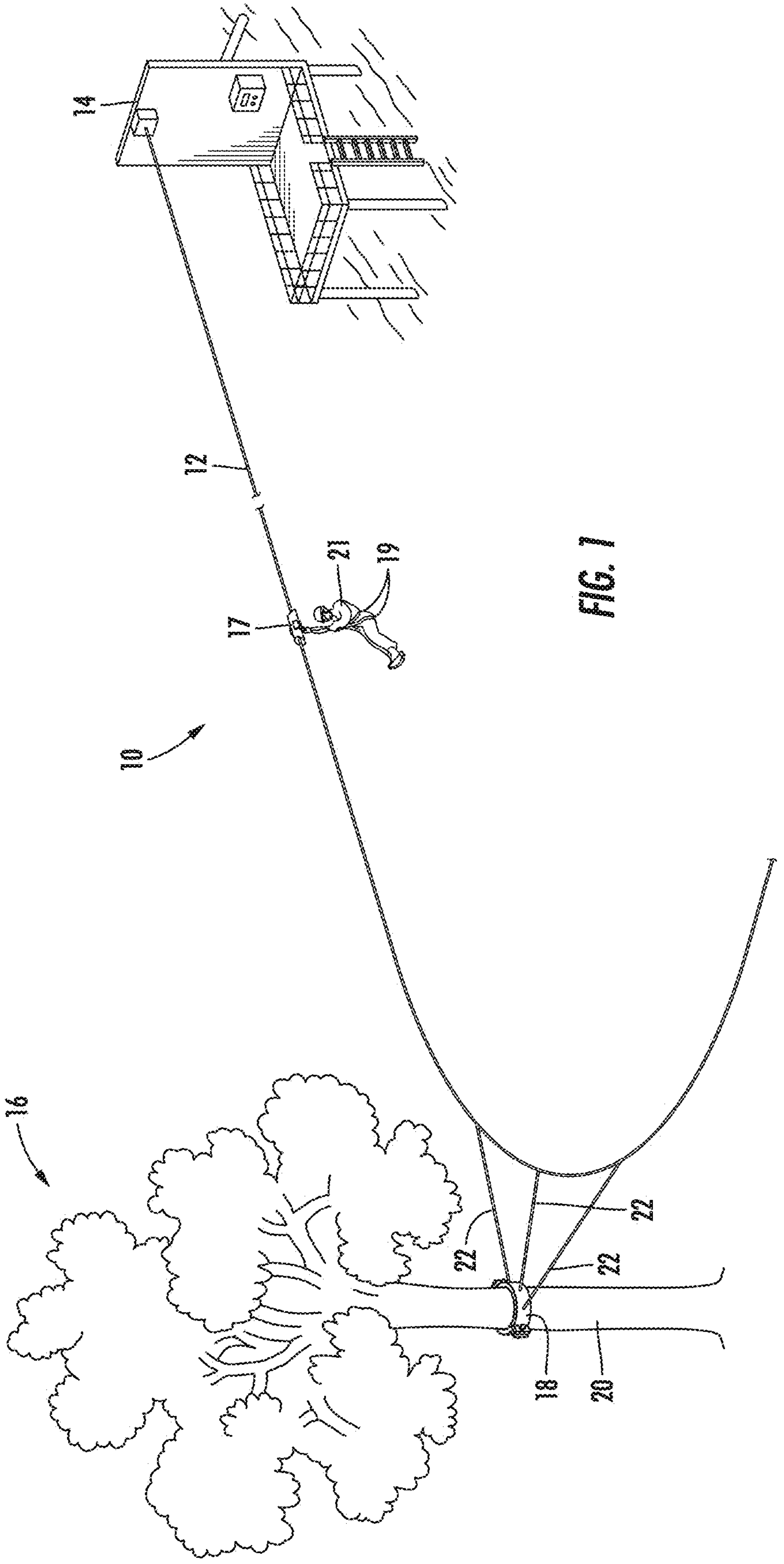
FIG. 1 is a perspective view of a specific embodiment of a wireline traversal device constructed in accordance with the present inventions, which is attached to a zip line and supporting a harness holding a rider, wherein the zip line is connected to a tree trunk and the zip line is curved adjacent the tree.
Figure 5A:
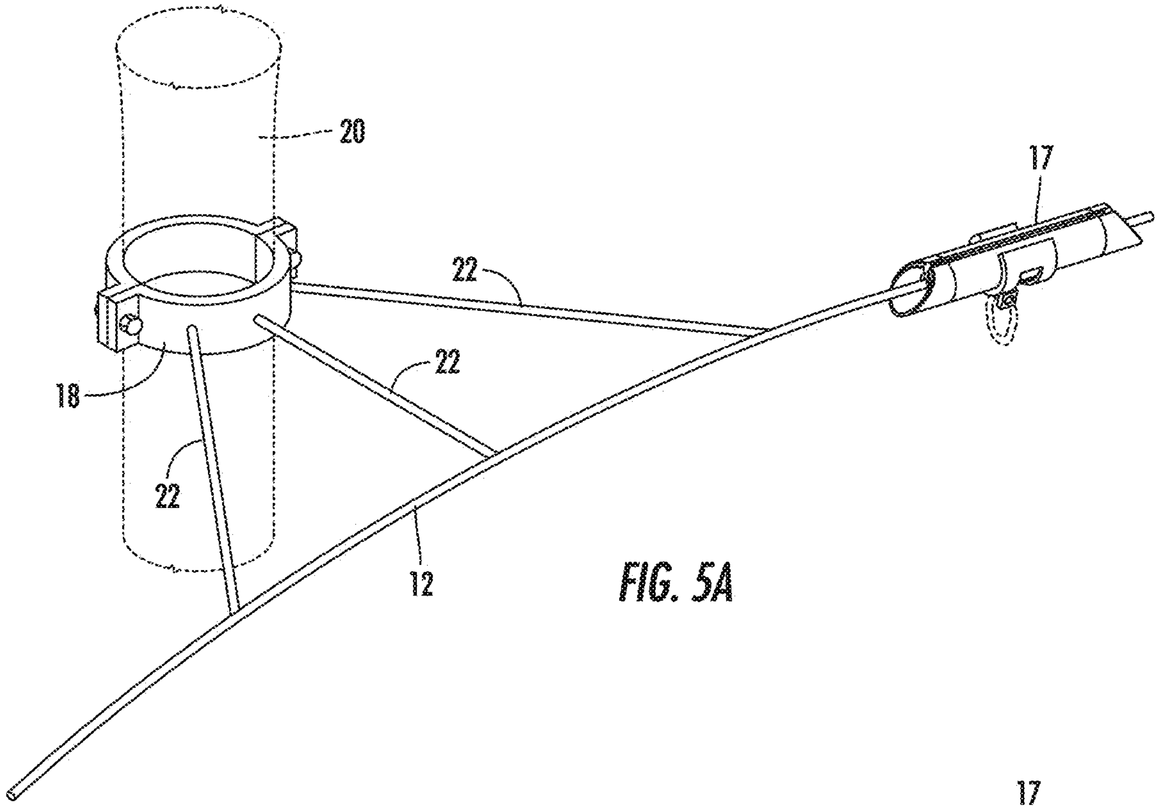
FIG. 5A is a perspective view illustrating a manner in which a zip line may be connected to a support member such as a tree trunk or pole, and illustrating a specific embodiment of a wireline traversal device constructed in accordance with the present inventions disposed on the zip line.
Figure 5B:
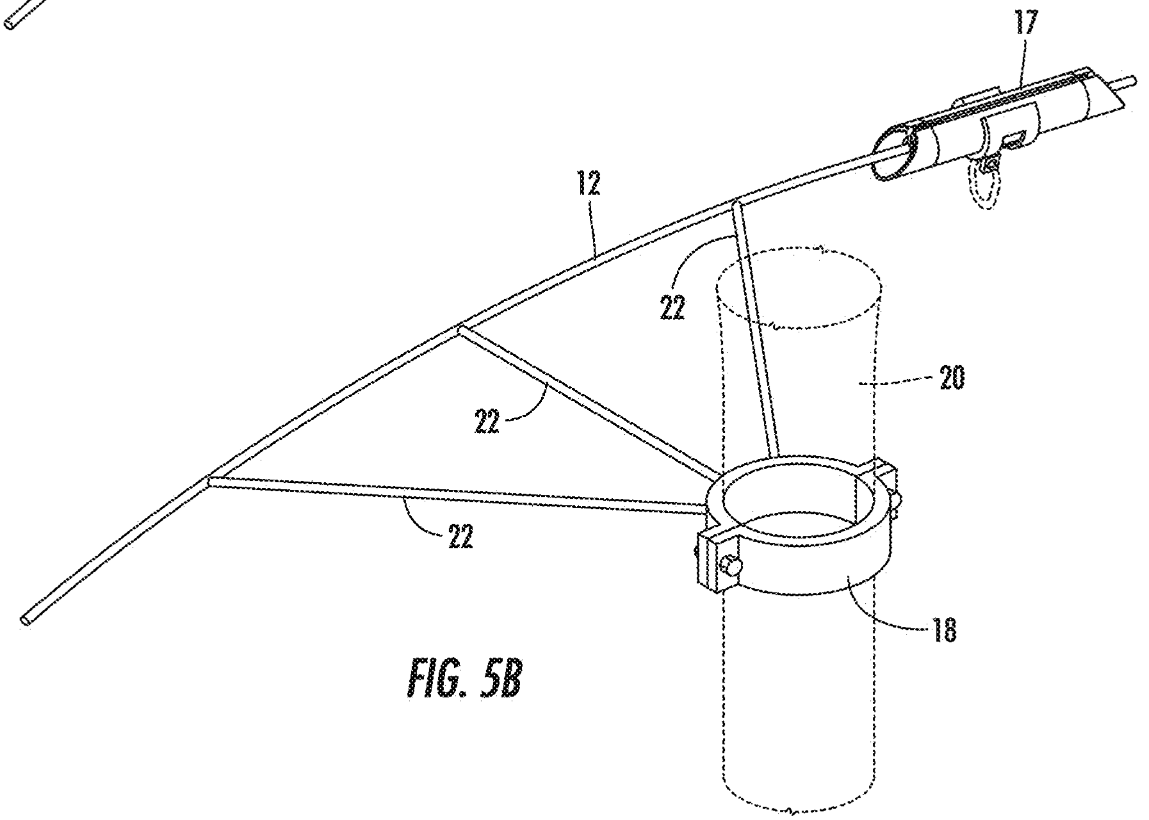
FIG. 5B is a perspective view similar to FIG. 5A illustrating another manner in which a zip line may be connected to a support member such as a tree trunk or pole, and illustrating a specific embodiment of a wireline traversal device constructed in accordance with the present inventions disposed on the zip line.

Referring to the drawings in detail, wherein like numerals denote identical elements throughout the several views, and referring initially to FIG. 1, there is shown a perspective view of a zip line system 10 having a zip line 12 extending from a platform 14 towards a tree 16. A wireline traversal device 17 is disposed on the zip line 12. A harness 19 is connected to and hangs down from the wireline traversal device 17. A person 21 is shown riding in the harness 19 and being supported on the zip line 12 by the wireline traversal device 17 as it moves along the zip line 12 and toward the tree 16. A support collar 18 is attached around a trunk 20 of the tree 16. A plurality of support rods 22 are connected to the support collar 18 at one end and to the zip line 12 at the other end to allow the zip line 12 to curve and extend in another direction away from the tree 16. This is further illustrated in FIGS. 5A and 5B. As explained hereinbelow, as the person 21 moves along the zip line 12 toward the tree 16, the design of the wireline traversal device 17 is such that it will contact and automatically move past each of the support rods 22 without disconnecting the wireline traversal device 17 from the zip line 12.

Figure 2:
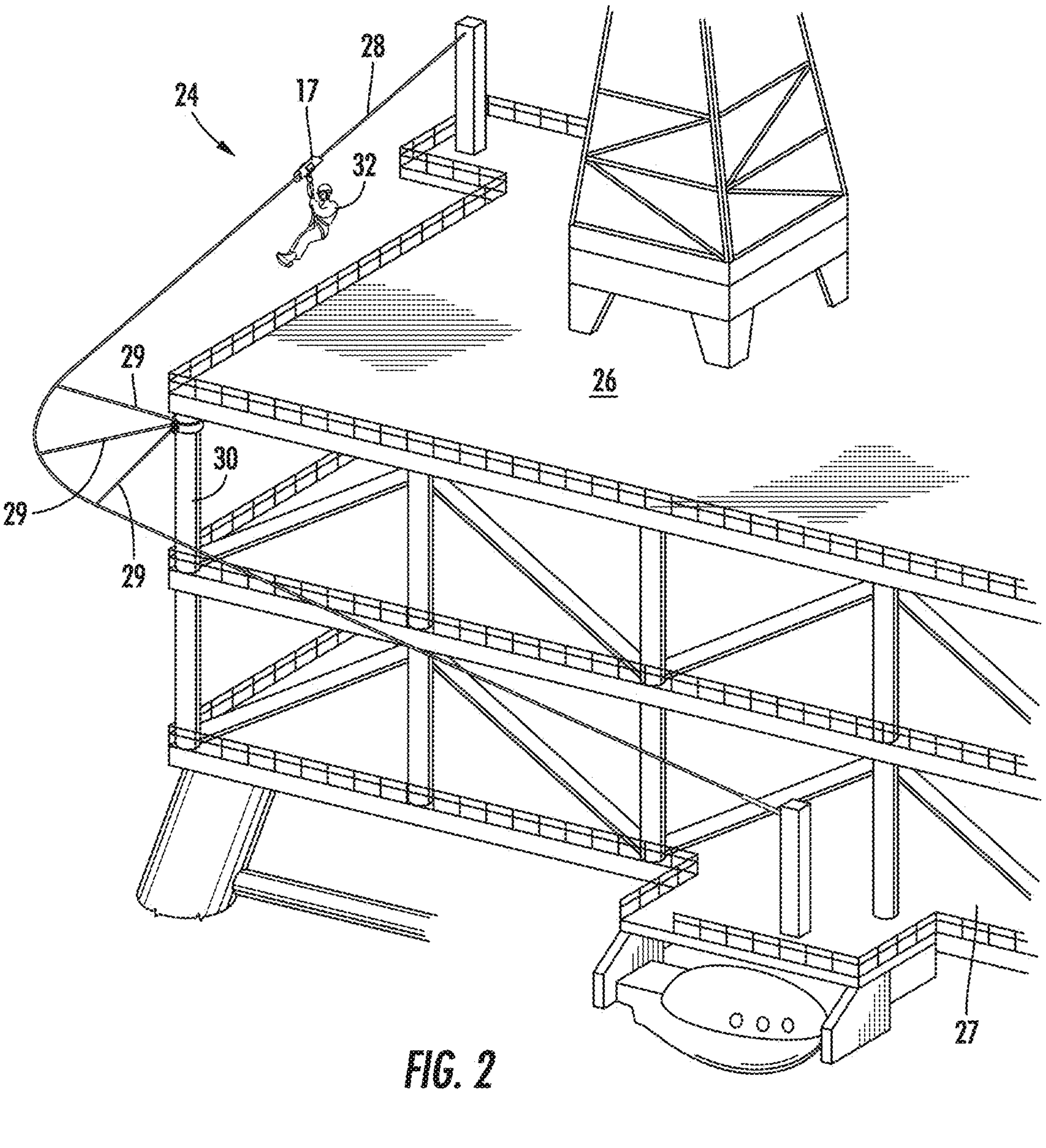
FIG. 2 is perspective view of an offshore platform in which a specific embodiment of a wireline traversal device constructed in accordance with the present inventions is attached to a zip line and connected to a worker, and being used to move the worker from an upper deck to a lower deck.

As explained above, there are a variety of scenarios in which wireline traversal devices of the present inventions may be employed, including, but not limited to, in connection with a zip line system 10, such as shown in FIG. 1. There are other applications in which wireline traversal devices of the present inventions may be advantageously used. By way of further, non-limiting example, another application in which wireline traversal devices of the present inventions may be used is on an off-shore oil and gas platform. In that regard, with reference now to FIG. 2, there is shown an off-shore platform 24 having an upper deck 26, a lower deck 27, and a zip line 28 extending from the upper deck 26 around a corner of the platform 24 to the lower deck 27. The zip line 28 is supported at a corner post 30 by support arms 29 to enable the zip line 28 to curve around a corner of the platform 24. A worker 32 is shown connected to a wireline traversal device 17 that is moving downwardly along the zip line 28. In the same manner as explained above and in more detail below, as the worker 32 and wireline traversal device 17 come into contact with each support arm 29, the design of the wireline traversal device 17 is such that it will automatically move past each of the support arms 29 without disconnecting the wireline traversal device 17 from the zip line 28.

Figure 3:
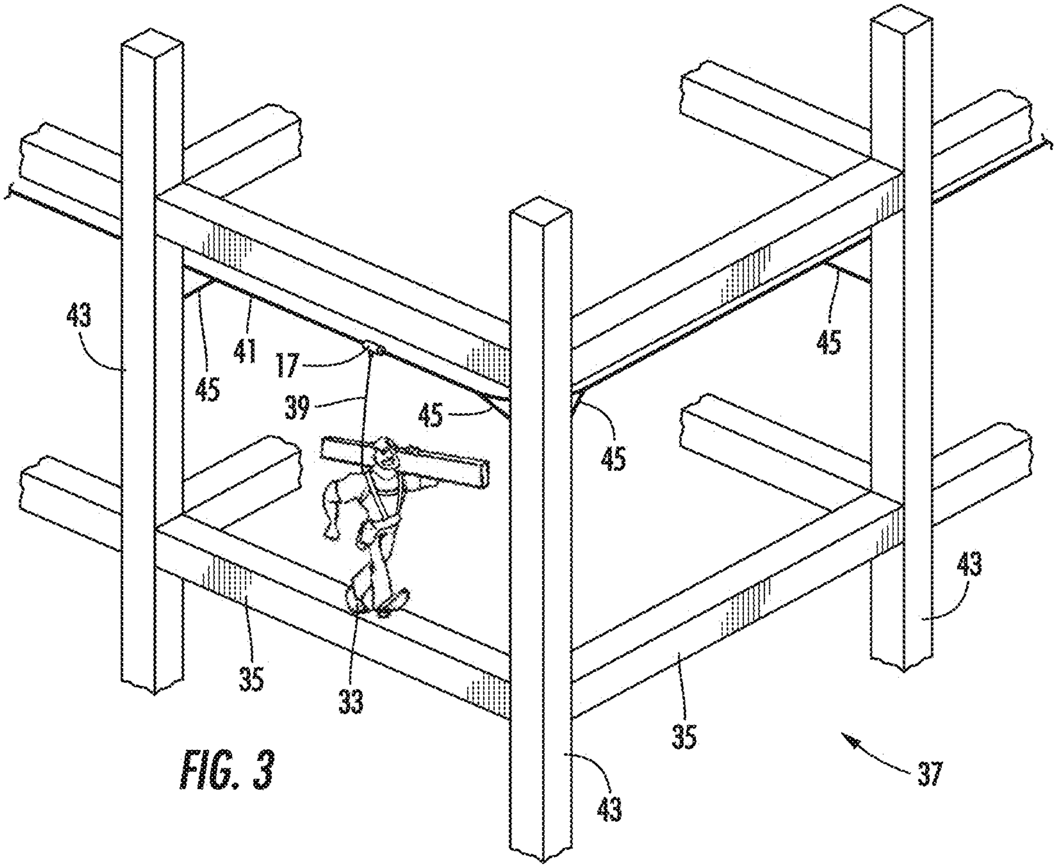
FIG. 3 is a perspective view of a high-rise building under construction and showing how a specific embodiment of a wireline traversal device constructed in accordance with the present inventions may be used to attach a safety line to a worker.
Figure 4:
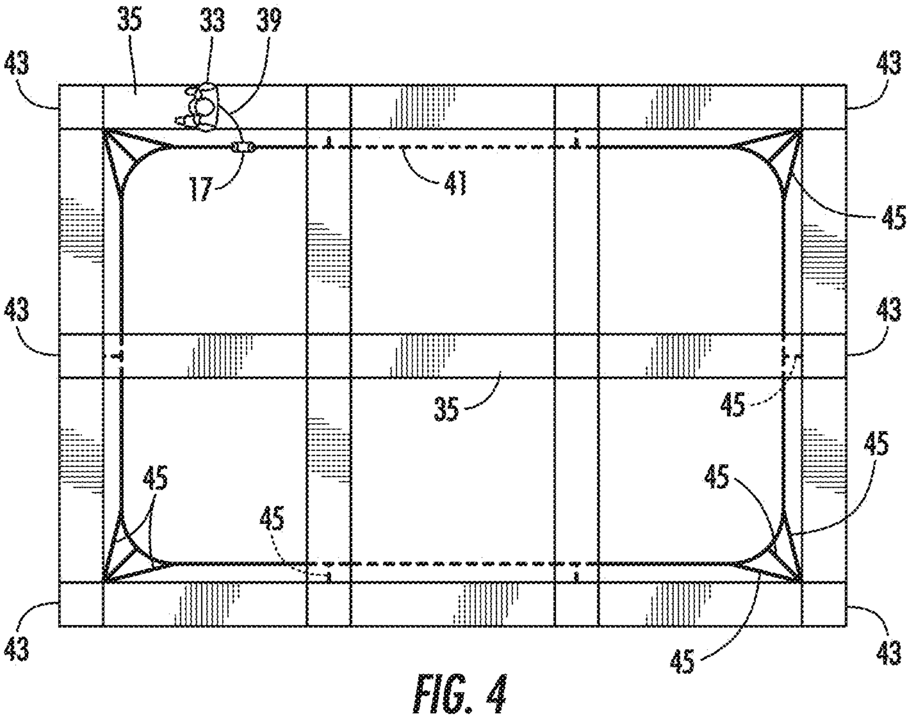
FIG. 4 is atop view of the high-rise building shown in FIG. 3 and illustrating an overhead safety line secured to the support structure of the high-rise building, with the wireline traversal device movably disposed on the overhead safety line and connected to the worker.

Another application in which the present inventions may be employed is as a safety device during construction of high-rise buildings. For example, with reference to FIGS. 3 and 4, a worker 33 is shown walking on a beam 35 that is part of the support structure of a high-rise building 37 that is under construction. The worker 33 is connected to a personal safety line 39 that is connected to a wireline traversal device 17, which is moveably disposed on an overhead safety line 41. The overhead safety line 41 is attached to exterior vertical support beams 43 by support arms 45. In the same manner as previously explained, as the worker 33 moves along the horizontal beams 35 the wireline traversal device 17 will contact each support arm 45 and automatically move past each of the support arms 45 without disconnecting the wireline traversal device 17 from the overhead safety line 41.

Figure 6A:
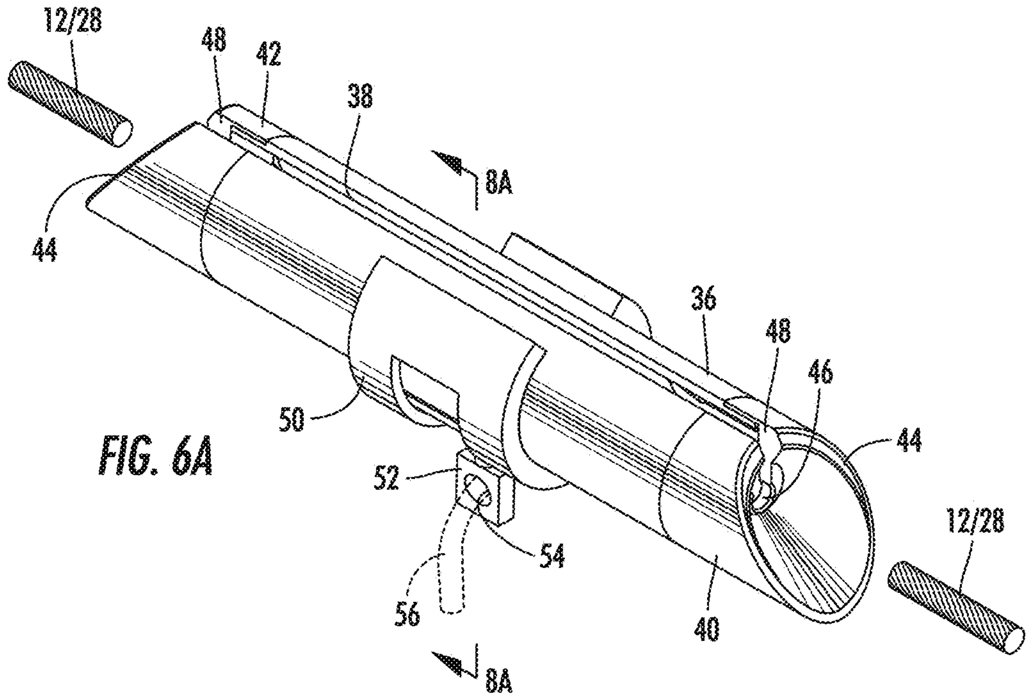
FIG. 6A is a perspective view of a specific embodiment of a wireline traversal device constructed in accordance with the present inventions.

Referring now to FIG. 6A, a larger view of a specific embodiment of the wireline traversal device 17 is shown. The wireline 12/28 passes through the interior of the wireline traversal device 17 along its longitudinal axis. In a specific embodiment, the wireline traversal device 17 may include an outer cylindrical housing 36 having a longitudinal slot 38. The wireline traversal device 17 may also include a forward end cap 40 and a rear end cap 42. The end caps 40/42 may be provided as separate components or integrally included as part of the outer housing 36. Each end cap 40/42 may include an inclined engagement surface 44, a central aperture 46 aligned with the longitudinal axis of the wireline traversal device 17 through which the wireline 12/28 passes, and a longitudinal slot 48 that is aligned with the longitudinal slot 38 in the outer housing 36. In a specific embodiment, a support sleeve 50 may be attached to the outer housing 36 for supporting a connector 52. The connector 52 may include an aperture 54 therethrough. A support line 56 shown in dashed lines may be passed through the aperture 54 and connected to the connector 52 on one end, and to the person 21 or worker 32 on the other end, such as through the harness 19 shown in FIG. 1. Additional details of the support sleeve 50 and connector 52 are discussed below.

Figure 6B:
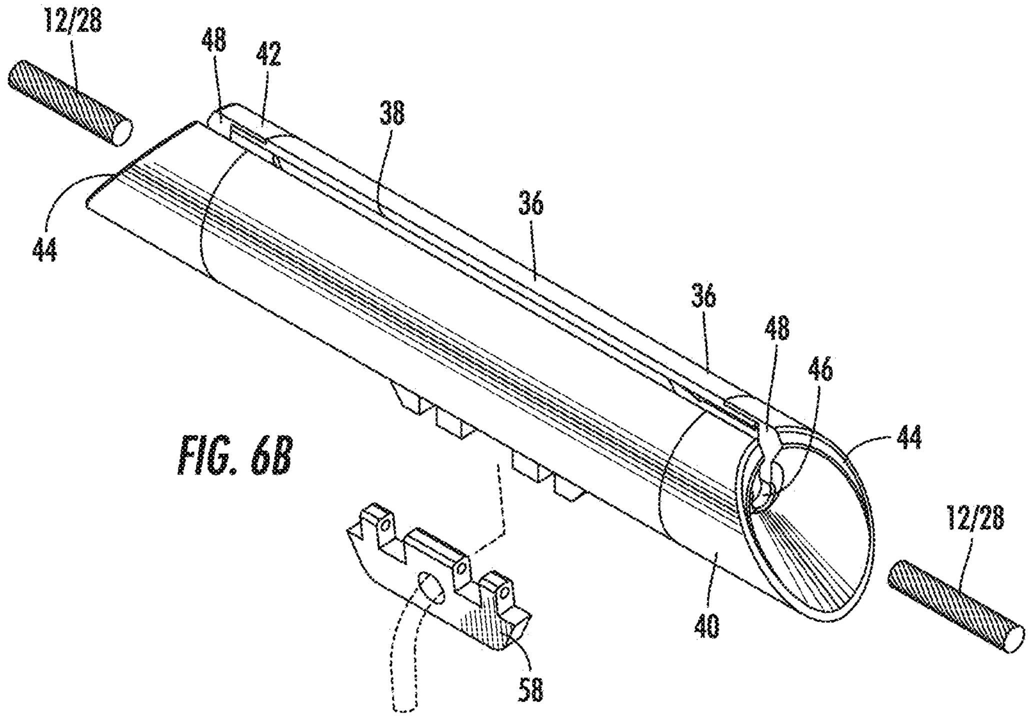
FIG. 6B is a perspective view of another specific embodiment of a wireline traversal device constructed in accordance with the present inventions.

With reference to FIG. 6B, in another specific embodiment, as an alternative to the support sleeve 50 and connector 52 shown in FIG. 6A and discussed above, the wireline traversal device 17 may include a rotatable connector 58 hingedly attached to the outer housing 36.

Figure 7:
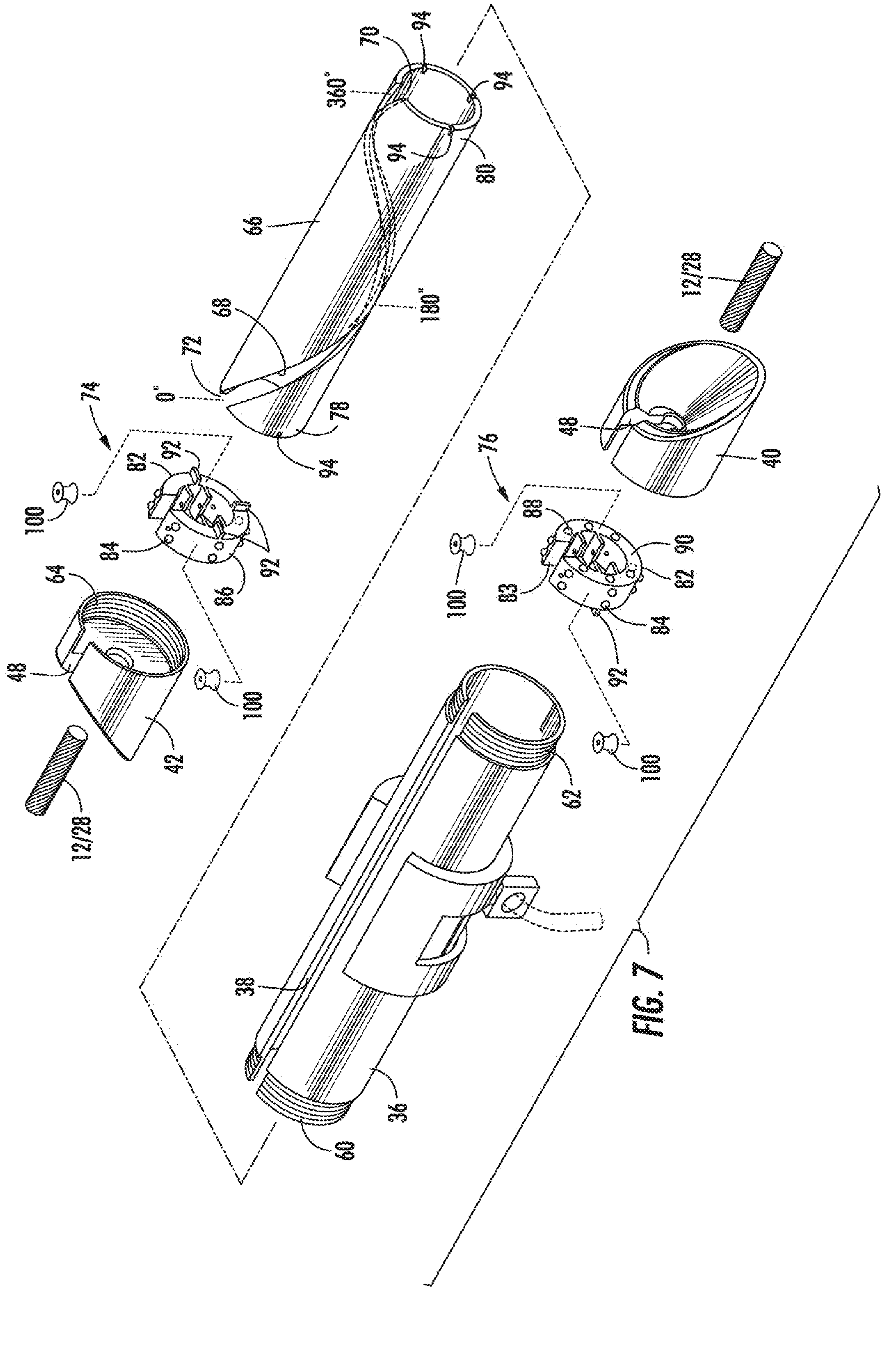
FIG. 7 is an exploded, perspective view of the specific embodiment of a wireline traversal device shown in FIG. 6A.

Referring now to FIG. 7, an exploded view is shown of the wireline traversal device 17 that is shown in FIG. 6A. From this view, it can be seen that, in a specific embodiment, the forward and rear end caps 40/42 may be threadably attached to the outer housing 36. Opposed ends of the outer housing 36 may be provided with rear threads 60 and forward threads 62. The forward and rear ends caps 40/42 may be provided with mating threads 64. The wireline traversal device 17 may also include an inner cylindrical housing 66 having a helical slot 68. In a specific embodiment, the helical slot 68 may have an entry point 70 and an exit point 72. In a specific embodiment, the entry and exit points 70 and 72 are aligned at the same location on the circumference of the inner housing 66. In a specific embodiment, the helical slot 68 may start on one end of the inner housing 66 at zero degrees and extend in a helical fashion a full 360 degrees and so as end at the other end of the inner housing 66 at the same location on the circumference of the inner housing that it started.

Figure 8B:
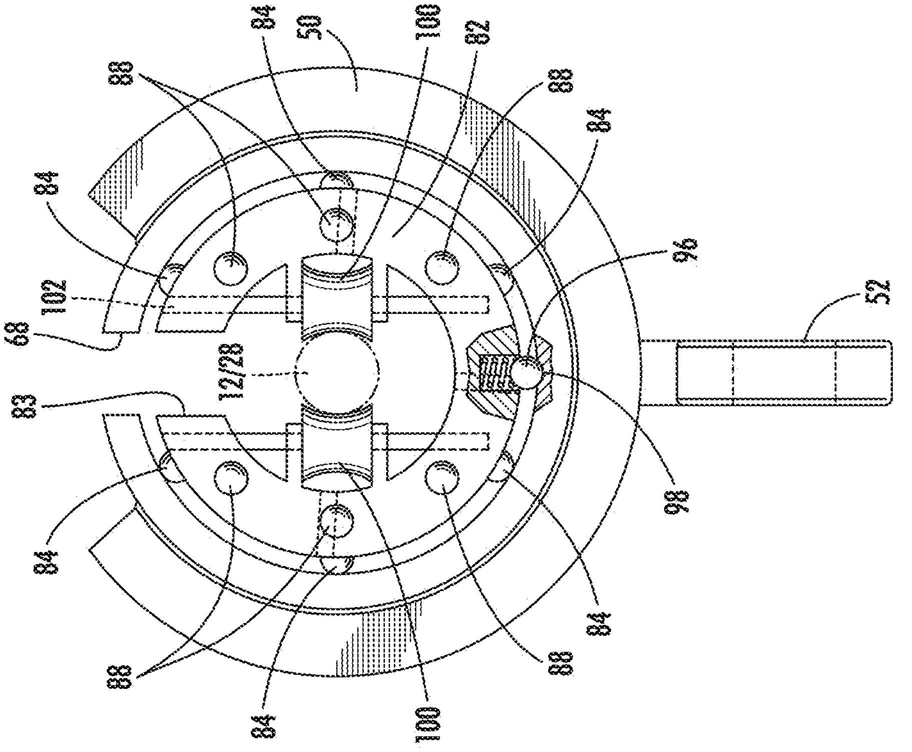
FIG. 8B is an end view of the wireline traversal device as shown in FIG. 6A.
Figure 9:
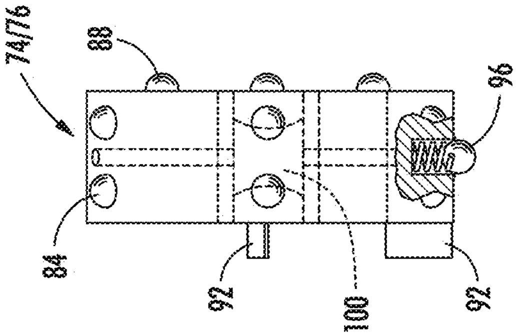
FIG. 9 is a side view of a bearing assembly disposed within an outer housing of the wireline traversal device shown in FIG. 6A and attached to an inner housing disposed within the outer housing.

The inner housing 66 is rotatably mounted within the outer housing 36. As shown in FIGS. 7, 8B and 9, in a specific embodiment, the wireline traversal device 17 may include a rear bearing member 74 connected to a rear end 78 of the inner housing 66, and a forward bearing member 76 connected to a forward end 80 of the inner housing 66. In a specific embodiment, each bearing member 74/76 may include a ring member 82 having a plurality of ball bearings 84 mounted to an outer cylindrical surface 86 of the ring member 82, and a plurality of ball bearings 88 mounted to an external edge surface 90 of the ring member 82. In a specific embodiment, the ring member 82 may include a slot 83, which, when aligned with the longitudinal slots 38 and 48, defines a home position or first configuration of the inner housing 66 relative to the outer housing 36. In a specific embodiment, each bearing member 74/76 may include a plurality of alignment tabs 92 adapted for engagement with a plurality of corresponding alignment notches 94 around the inner and forward ends 78 and 80 of the inner housing 66. In a specific embodiment, the wireline traversal device 17 preferably includes at least two bearing members, such as rear and forward bearing members 74 and 76, but may also include additional bearing members if desired.

With reference to FIGS. 8B and 9, in a specific embodiment, each of the bearing members 74/76 may include a spring-loaded detent ball assembly 96 adapted for engagement with its own corresponding recess 98 in an inner surface of the outer housing 36. Each spring-loaded detent ball assembly 96 is engaged with its corresponding recess 98 when the inner housing 66 is in its home position. In a specific embodiment, the bearing members 74/76 may also include a pair of guide spools 100 rotatably mounted on spool axles 102 that are secured to the ring member 82. As best shown in FIG. 8B, the guide spools 100 are spaced apart in aligned relationship for guiding engagement with the wireline 12/28 as it passes within and along the central longitudinal axis of the wireline traversal device 17.

Figure 8A:
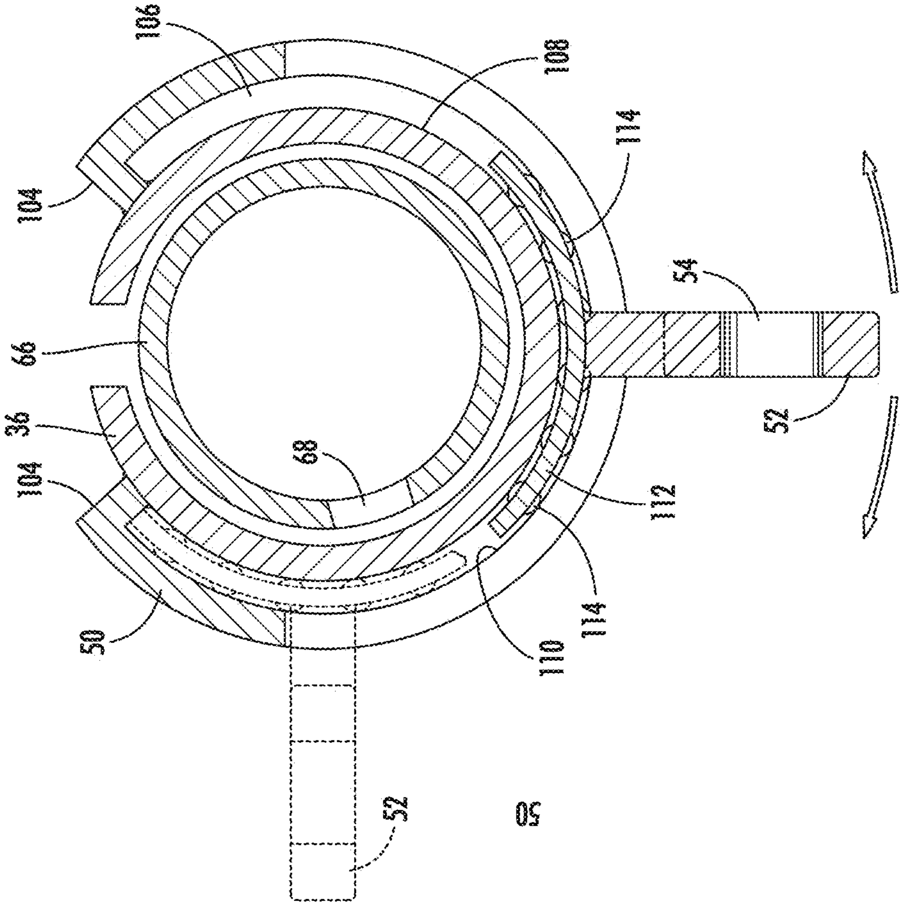
FIG. 8A is a cross-sectional view taken along line 8A-8A of FIG. 6A.
Figure 10:
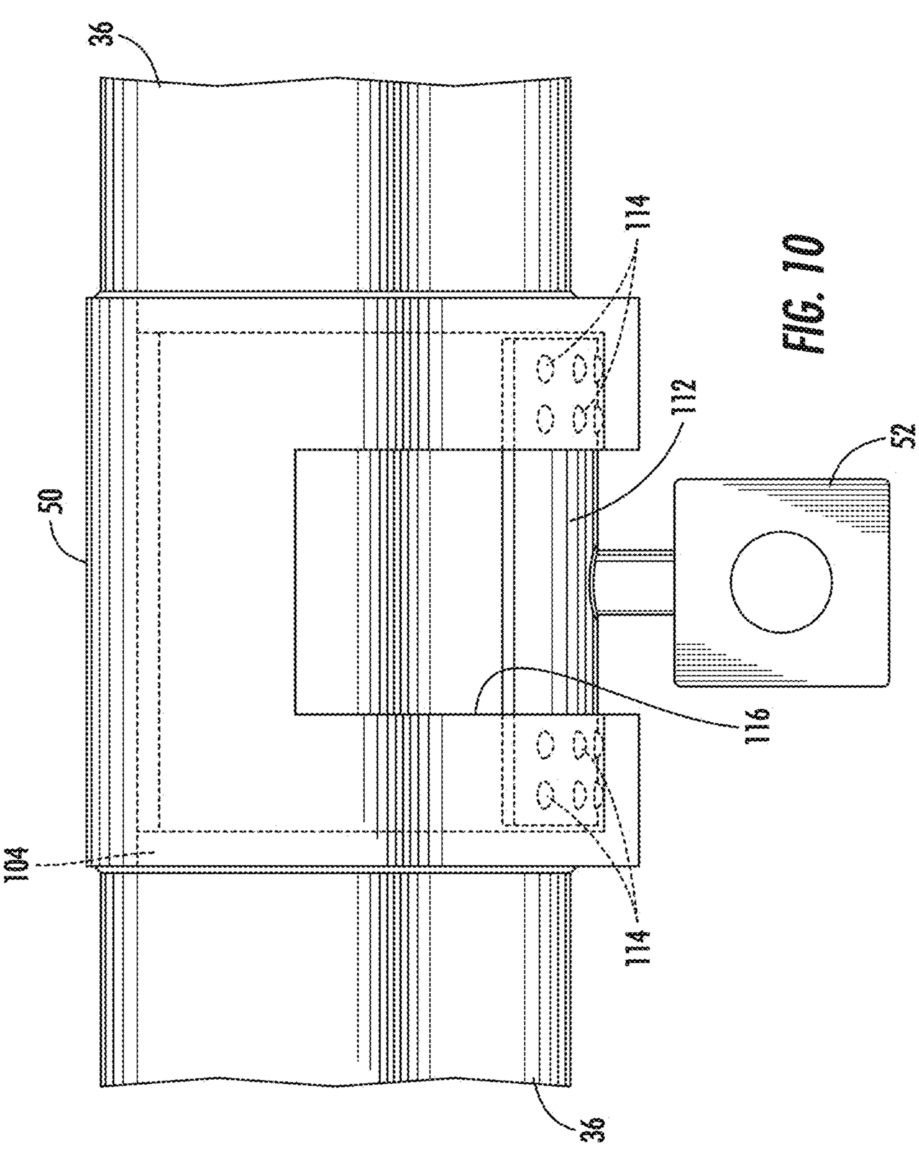
FIG. 10 is a side view of a central portion of the wireline traversal device as shown in FIG. 6A.

Referring now to FIGS. 8A and 10, additional details will be provided with regard to the support sleeve 50 and connector 52 discussed above in connection with FIG. 6A. As best shown in FIG. 8A, the sleeve 50 may include raised edges 104 around the periphery of the sleeve 50. The sleeve 50 may be in the shape of a partial cylinder. The raised edges 104 of the sleeve 50 are attached to the outer housing 36 so as to form a spaced apart semi-circular space 106 between the outer surface 108 of the outer housing 36 and the inner surface 110 of the sleeve 50. A retainer plate 112 having a semi-circular profile is moveably disposed within the semi-circular space 106. In a specific embodiment, the retainer plate 112 may be provided with a plurality of ball bearings 114 on opposite ends of the retainer plate 112 (see FIG. 10) to facilitate movement of the retainer plate 112 within the semi-circular space 106. The connector 52 is attached to or formed as part of the retainer plate 112. As best shown in FIG. 10, the sleeve 50 may be provided with a window 116 within which the connector 52 may move from side to side relative to the outer housing 36 as the wireline traversal device 17 moves along the zip line 12 and passes around the support arms 22/29/45. In this manner, the connector 52 may be maintained in a generally vertical position under the weight of the person 21/32/33 as the wireline traversal device 17 moves along the wireline 12/28/41. As best shown in FIG. 8A, in a specific embodiment, the window 116 and the semi-circular space 106 may be sized to allow the connector 52 to move 90 degrees in either direction.

Figure 11B:
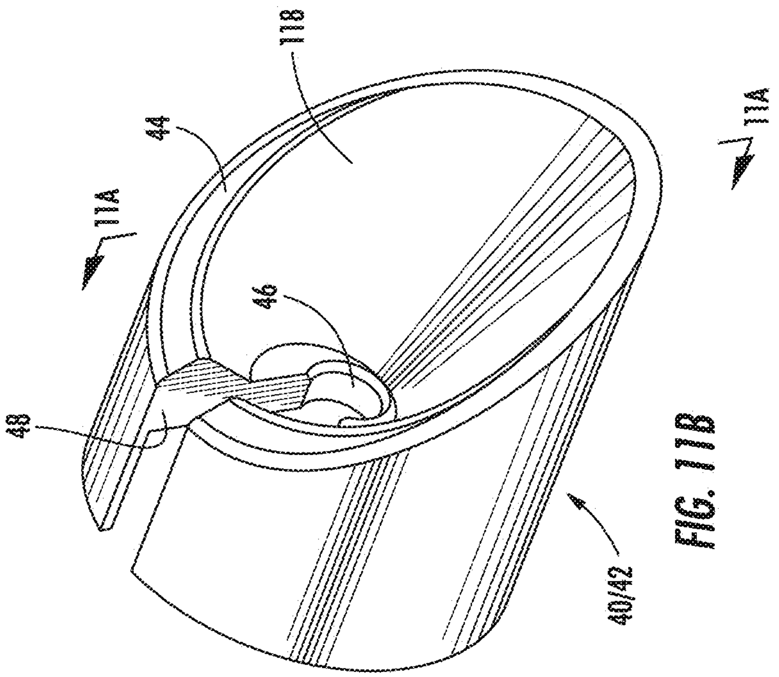
FIG. 11B is a perspective view of an end cap of the wireline traversal device as shown in FIG. 6A.
Figure 11A:
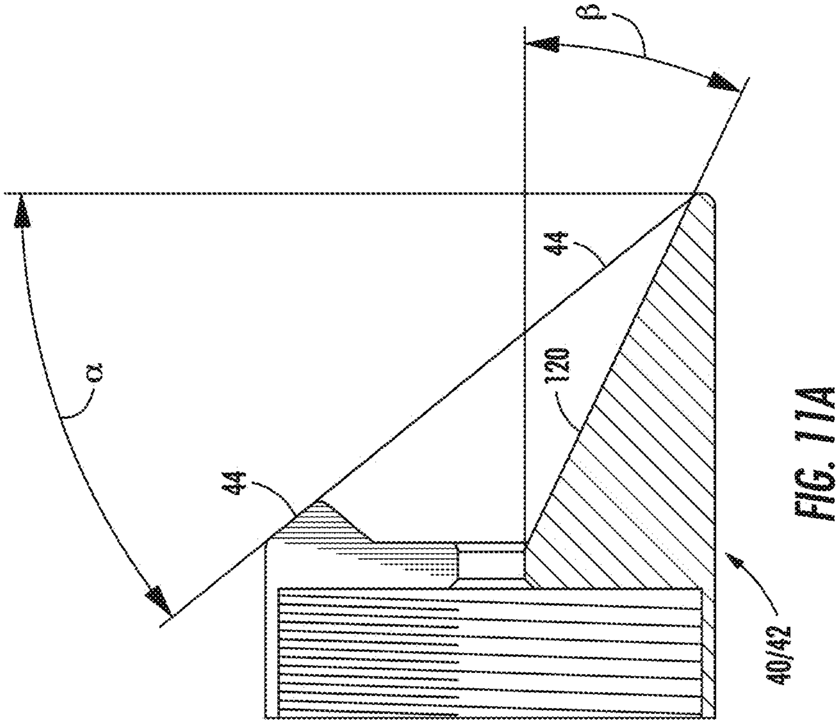
FIG. 11A is a cross-sectional view taken along lines 11A-11A in FIG. 11B and illustrating various angles of incline corresponding to an end cap of the wireline traversal device as shown in FIG. 6A.

With reference to FIGS. 11A and 11B, the inclined engagement surface 44 of the end caps 40/42 may be inclined at an angle $\alpha$ from vertical. The scope of the present inventions is not limited to any particular angle $\alpha$. By way of example only, in a specific embodiment, the angle $\alpha$ may be approximately 40 degrees. By way of further example, in another specific embodiment, the angle $\alpha$ may be in the range from about 25 to about 55 degrees. The end caps 40/42 may also include a funneled surface 118 extending inwardly from the inclined engagement surface 44 toward the central aperture 46. In a specific embodiment, a lowermost inclined surface 120 of the funneled surface 118 may extend upwardly toward the central aperture 46 at an angle $\beta$ relative to horizontal. Here again, the scope of the present inventions is not limited to any particular angle $\beta$. By way of example only, in a specific embodiment, the angle $\beta$ may be approximately 25 degrees. By way of further example, in a specific embodiment, the angle $\beta$ may be in the range from about 10 to about 40 degrees.

In operation, as the wireline traversal device 17 is moving along the wireline 12/28/41, the wireline traversal device 17 is in a first configuration or home position in which the forward end of the helical slot 68 on the inner housing 66 is aligned with the longitudinal slot 38 of the outer housing 36 and the longitudinal slot 48 of the forward end cap 40. As the wireline traversal device 17 moves along the wireline 12/28/41 it will eventually come into contact with a support arm 22/29/45 that supports the wireline 12/28/41, such as at a location where the path of the wireline 12/28/41 bends or curves around a corner. When the forward end cap 40 contacts a support arm 22/29/45, the outer housing 36 will rotate to allow the support arm 22/29/45 to be guided along the inclined surface 44 of the end cap 40 and into the longitudinal slot 38/48 and helical slot 68. As the support arm 22/29/45 is guided along the helical slot 68, the inner housing 66 will rotate within the outer housing 36, and thereby allow the wireline traversal device 17 to pass by the support arm 22/29/45 and continue moving along the wireline 12/28/41 and around the corner without disconnecting the wireline traversal device 17 from the wireline 12/28/41. When a support arm 22/29/45 exits the longitudinal slot 48 on the rear end cap 42, the wireline traversal device 17 will be returned to its first configuration or home position, and maintained in that position by the detent ball assemblies 96 and recesses 98, as shown in FIG. 8B.

Figure 12:
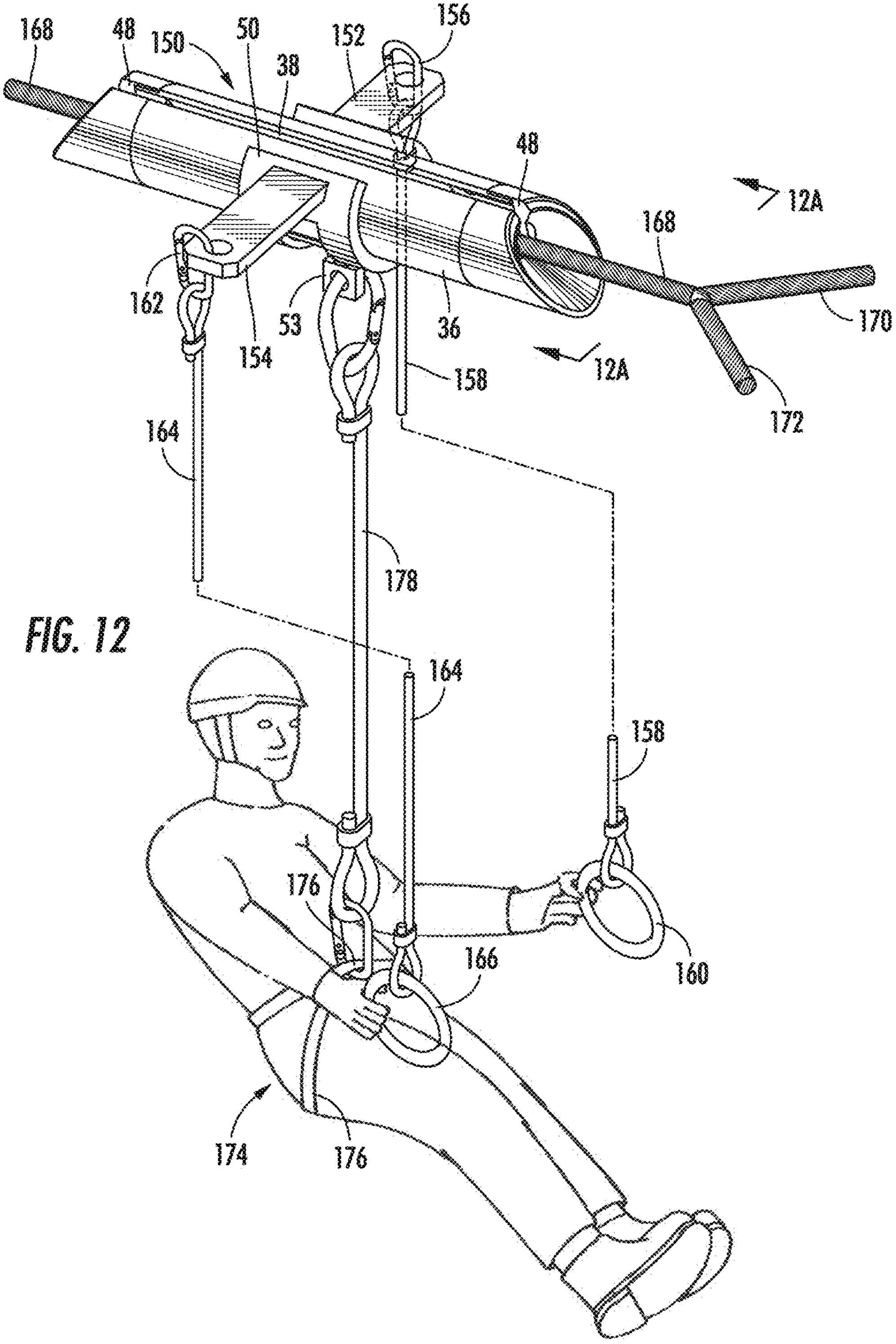
FIG. 12 is a perspective view of another specific embodiment of wireline traversal device in accordance with the present inventions in which the wireline traversal device can be steered by a user thereof.
Figure 12A:
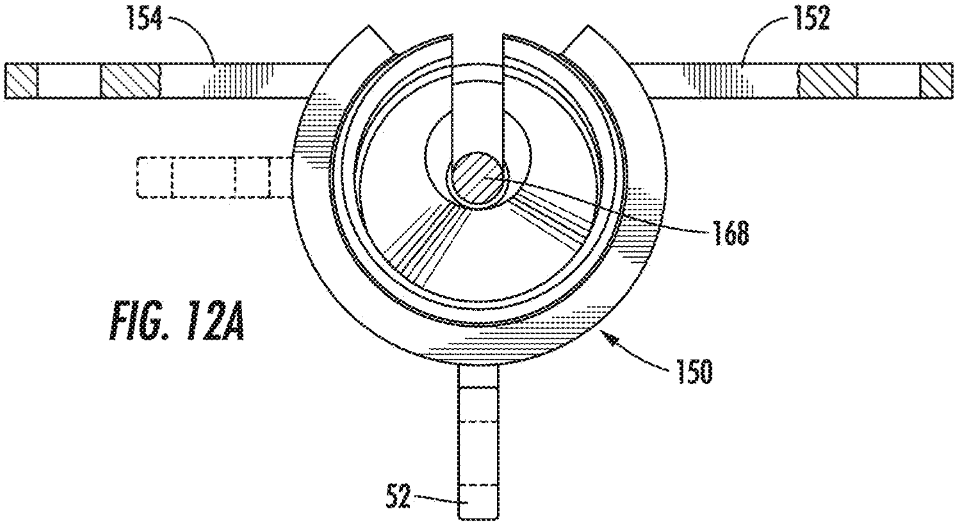
FIG. 12A is an end view of the wireline traversal device shown in FIG. 12 taken along line 12A-12A of FIG. 12 but without any cords attached thereto.

Another embodiment of a wireline traversal device that can be steered will now be described in connection with FIGS. 12, 12A and 13. Referring now to FIG. 12, an alternative embodiment of a wireline traversal device 150 is shown. The structure and operation of the wireline traversal device 150 is the same as discussed and described above, so will not be stated again here. However, the new features of the wireline traversal device 150 will now be explained in detail. In a specific embodiment, the wireline traversal device 150 may include a left steer arm 152 and a right steer arm 154. The left steer arm 152 may be connected to the left side of the outer housing 36, such as to the left side of the support sleeve 50. The right steer arm 154 may be connected to the right side of the outer housing 36, such as to the right side of the support sleeve 50.

A distal end of the left steer arm 152 may include an aperture for receiving a left connector 156 attached to a left steer cord 158. A left handle 160 may be connected to a lower end of the left steer cord 158. A distal end of the right steer arm 154 may include an aperture for receiving a right connector 162 attached to a right steer cord 164. A right handle 166 may be connected to a lower end of the right steer cord 164. The cords may be directly attached to the steer arms without use of connectors.

The wireline traversal device 150 is shown positioned on a main zip line 168 that is connected to a left zip line 170 that branches to the left and a right zip line 172 that branches to the right. A rider 174 is shown in a harness 176 connected by a support cord 178 that is attached to the connector 52 on the wireline traversal device 150. The structure and operation of the connector 52 is explained above.

In operation, as the rider 176 moves down the main zip line 168 and approaches the fork defined at the left zip line 170 and the right zip line 172, the rider 176 will need to decide which branch the rider 176 wants to traverse. If the rider 176 wants to go down the left zip line 170, the rider 176 will need to pull down on the right steer cord 164. This will cause the right zip line 172 to engage with the longitudinal slots 38/48 on the wireline traversal device 150 (described and discussed above), which will cause the wireline traversal device 150 to go down the left zip line 170. Similarly, if the rider 176 wants to go down the right zip line 172, the rider 176 will need to pull down on the left steer cord 158. This will cause the left zip line 170 to engage with the longitudinal slots 38/48, which will cause the wireline traversal device 150 to go down the right zip line 172. To facilitate this operation, in use, it is preferred that the rider 174 hold the left and right steer cords 158 and 164 in a criss-cross fashion, with the left handle 160 in the rider's right hand and the right handle 166 in the rider's left hand.

In a specific embodiment, this alternative embodiment of the wireline traversal device 150 may also be used in a worker safety environment as opposed to a zip line environment. Referring now to FIG. 13, a safety wireline system 200 is shown mounted to a building structure 202, such as on top of a roof of the building structure 202. In a specific embodiment, the wireline system 200 may include corner support posts 204, 206, 208, and 210. The wireline system 200 may also include interior support posts 212 and 214. The system 200 may include an outer safety cable 216 that may extend between the corner posts 204, 206, 208, and 210. The outer cable 216 may be connected to the corner posts in the same manner as shown in FIG. 1 and described in connection with zip line 12 and the connectors 22 and the tree trunk 20.

Figure 13:
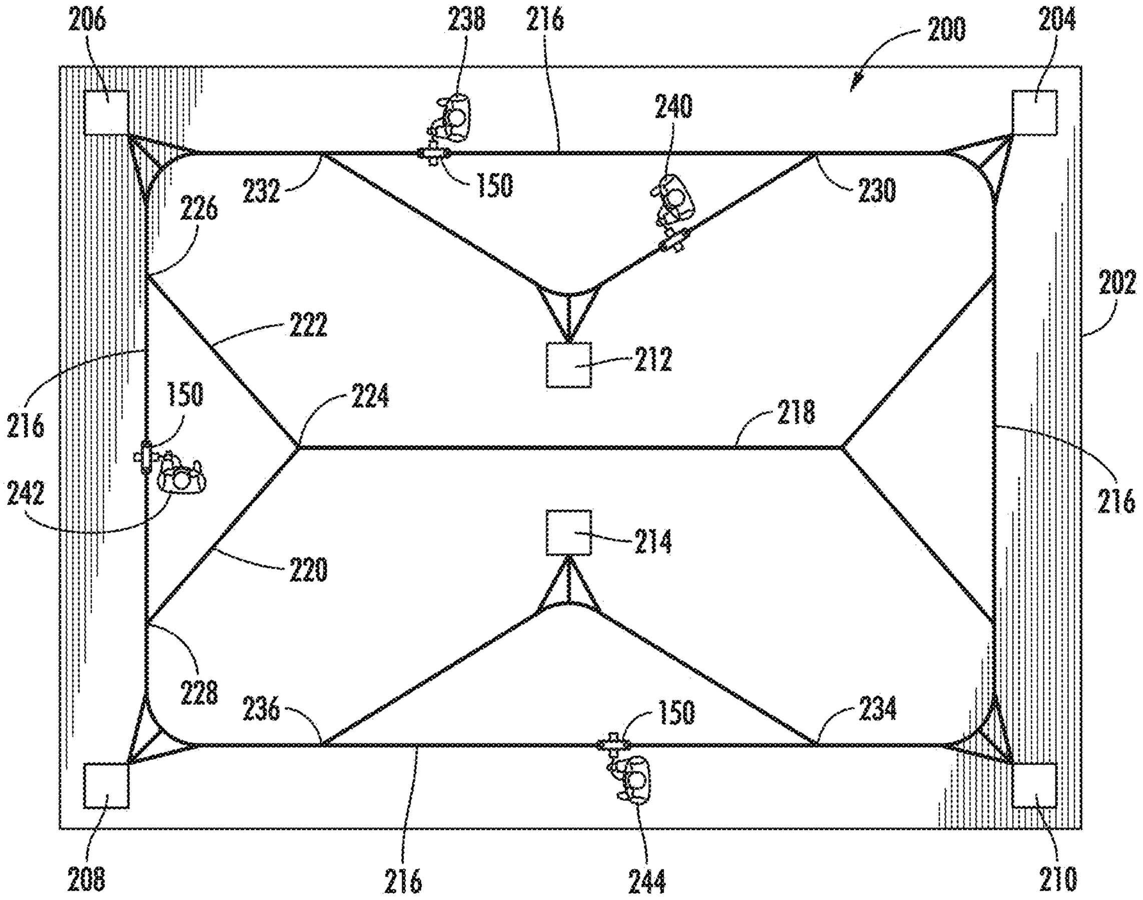
FIG. 13 is top view of a safety wireline system mounted on top of a building structure and illustrating workers tethered to a wireline traversal device such as shown in FIGS. 12 and 12A.

Still referring to FIG. 13, the system 200 may include a central safety cable section having a main central cable 218 having a left end and a right end. The left end of the main cable 218 is connected to a left front cable 220 and a left rear cable 222, to define a fork 224. Distal ends of the left front cable 220 and the left rear cable 222 are connected in a "Y" configuration to the left side of the outer safety cable 216 to form forks 226 and 228. The right side of the central safety cable section may be a mirror image of the left side.

The system 200 may also include forward and rear safety cable sections. The rear safety cable section may be connected between the interior support post 212 and the rear section of the outer safety cable 216 to define forks 230 and 232. The front safety cable section may be connected in like manner to the interior support post 214 and the front section of the outer safety cable 216 to form forks 234 and 236. All of the cables shown in FIG. 13 may be generally at the same height above the roof and the workers that are walking on the roof.

This system 200 of various safety cables extending generally around the perimeter of the roof and to locations in the middle of the roof will allow various workers 238-244 to safely traverse around the roof while connected to a wireline traversal device 150 that is adapted to navigate the various forks identified above in the same manner as described in connection with navigation of the left and right zip lines 170 and 172 shown in FIG. 12.

It is to be understood that the inventions disclosed herein are not limited to the exact details of construction, operation, exact materials or embodiments shown and described. Although specific embodiments of the inventions have been described, various modifications, alterations, alternative constructions, and equivalents are also encompassed within the scope of the inventions. Although the present inventions may have been described using a particular series of steps, it should be apparent to those skilled in the art that the scope of the present inventions is not limited to the described series of steps. The specification and drawings are, accordingly, to be regarded in an illustrative rather than a restrictive sense. It will be evident that additions, subtractions, deletions, and other modifications and changes may be made thereunto without departing from the broader spirit and scope of the inventions as set forth in the claims set forth below. Accordingly, the inventions are therefore to be limited only by the scope of the appended claims.

The invention claimed is:

1. A wireline traversal device comprising:

an outer cylindrical housing having a longitudinal slot;

a forward end cap having a longitudinal slot and an inclined engagement surface, the forward end cap being attached to a forward end of the outer cylindrical housing, the longitudinal slot on the outer cylindrical housing being aligned with the longitudinal slot on the forward end cap;

an inner cylindrical housing having a helical slot having an entry point and an exit point, the inner cylindrical housing being rotatably disposed within the outer cylindrical housing and having a home position in which the entry point of the helical slot is aligned with the longitudinal slot on the outer cylindrical housing and with the longitudinal slot on the forward end cap;

a left steer arm connected to a left side of the outer cylindrical housing; and a right steer arm connected to a right side of the outer cylindrical housing.

2. The wireline traversal device of claim 1, further including a rear bearing member and a forward bearing member, the rear bearing member connected to a rear end of the inner cylindrical housing, the forward bearing member connected to a forward end of the inner cylindrical housing, each of the rear bearing member and the forward bearing member being rotatably disposed within the outer cylindrical housing.

3. The wireline traversal device of claim 2, wherein each of the rear bearing member and the forward bearing member includes a spring-loaded detent ball bearing adapted for engagement with a corresponding recess in an inner surface of the outer cylindrical housing, each spring-loaded detent ball bearing being engaged with its corresponding recess when the inner cylindrical housing is in its home position.

4. The wireline traversal device of claim 2, wherein the rear bearing member includes an alignment tab engaged with an alignment notch in the rear end of the inner cylindrical housing, and the forward bearing member includes an alignment tab engaged with an alignment notch in the forward end of the inner cylindrical housing.

5. The wireline traversal device of claim 1, further including:

a support sleeve attached to an exterior surface of the outer cylindrical housing and defining a semi-circular space between an inner surface of the support sleeve and the exterior surface of the outer cylindrical housing; and a retainer plate having a semi-circular profile and moveably disposed within the semi-circular space, the retainer plate further including a connector having an aperture therethrough.

6. The wireline traversal device of claim 5, the retainer plate further including a plurality of ball bearings disposed within the semi-circular space to facilitate movement of the retainer plate within the semi-circular space.

7. The wireline traversal device of claim 1, further including a connector rotatably attached to the outer cylindrical housing.

8. The wireline traversal device of claim 1, wherein the helical slot in the inner cylindrical housing traverse 360 degrees in a spiral around and along a length of the inner cylindrical housing from the entry point to the exit point.

9. The wireline traversal device of claim 1, further including a left steer cord connected to the left steer arm, and a right steer cord connected to the right steer arm.

10. A wireline traversal device comprising:

an outer cylindrical housing having a longitudinal slot;

a forward end cap having a longitudinal slot and an inclined engagement surface, the forward end cap being attached to a forward end of the outer cylindrical housing, the longitudinal slot on the outer cylindrical housing being aligned with the longitudinal slot on the forward end cap;

an inner cylindrical housing having a helical slot having an entry point and an exit point, the inner cylindrical housing being rotatably disposed within the outer cylindrical housing and having a home position in which the entry point of the helical slot is aligned with the longitudinal slot on the outer cylindrical housing and with the longitudinal slot on the forward end cap;

a rear bearing member and a forward bearing member, the rear bearing member connected to a rear end of the inner cylindrical housing, the forward bearing member connected to a forward end of the inner cylindrical housing, each of the rear bearing member and the forward bearing member being rotatably disposed within the outer cylindrical housing;

a left steer arm connected to a left side of the outer cylindrical housing; and a right steer arm connected to a right side of the outer cylindrical housing.

11. The wireline traversal device of claim 10, wherein each of the rear bearing member and the forward bearing member includes a spring-loaded detent ball bearing adapted for engagement with a corresponding recess in an inner surface of the outer cylindrical housing, each spring-loaded detent ball bearing being engaged with its corresponding recess when the inner cylindrical housing is in its home position.

12. The wireline traversal device of claim 10, wherein the rear bearing member includes an alignment tab engaged with an alignment notch in the rear end of the inner cylindrical housing, and the forward bearing member includes an alignment tab engaged with an alignment notch in the forward end of the inner cylindrical housing.

13. The wireline traversal device of claim 10, further including:

a support sleeve attached to an exterior surface of the outer cylindrical housing and defining a semi-circular space between an inner surface of the support sleeve and the exterior surface of the outer cylindrical housing; and a retainer plate having a semi-circular profile and moveably disposed within the semi-circular space, the retainer plate further including a connector having an aperture therethrough.

14. The wireline traversal device of claim 13, the retainer plate further including a plurality of ball bearings disposed within the semi-circular space to facilitate movement of the retainer plate within the semi-circular space.

15. The wireline traversal device of claim 10, further including a connector rotatably attached to the outer cylindrical housing.

16. The wireline traversal device of claim 10, wherein the helical slot in the inner cylindrical housing traverse 360 degrees in a spiral around and along a length of the inner cylindrical housing from the entry point to the exit point.

17. A wireline traversal device comprising:

an outer cylindrical housing having a longitudinal slot;

a forward end cap having a longitudinal slot and an inclined engagement surface, the forward end cap being attached to a forward end of the outer cylindrical housing, the longitudinal slot on the outer cylindrical housing being aligned with the longitudinal slot on the forward end cap;

an inner cylindrical housing having a helical slot having an entry point and an exit point, the inner cylindrical housing being rotatably disposed within the outer cylindrical housing and having a home position in which the entry point of the helical slot is aligned with the longitudinal slot on the outer cylindrical housing and with the longitudinal slot on the forward end cap;

a support sleeve attached to an exterior surface of the outer cylindrical housing and defining a semi-circular space between an inner surface of the support sleeve and the exterior surface of the outer cylindrical housing;

a retainer plate having a semi-circular profile and moveably disposed within the semi-circular space, the retainer plate further including a connector having an aperture therethrough;

a left steer arm connected to a left side of the support sleeve; and a right steer arm connected to a right side of the support sleeve.

18. The wireline traversal device of claim 17, the retainer plate further including a plurality of ball bearings disposed within the semi-circular space to facilitate movement of the retainer plate within the semi-circular space.

19. The wireline traversal device of claim 17, further including a rear bearing member and a forward bearing member, the rear bearing member connected to a rear end of the inner cylindrical housing, the forward bearing member connected to a forward end of the inner cylindrical housing, each of the rear bearing member and the forward bearing member being rotatably disposed within the outer cylindrical housing.

20. The wireline traversal device of claim 19, wherein each of the rear bearing member and the forward bearing member includes a spring-loaded detent ball bearing adapted for engagement with a corresponding recess in an inner surface of the outer cylindrical housing, each spring-loaded detent ball bearing being engaged with its corresponding recess when the inner cylindrical housing is in its home position.

* * * * *